US007872201B1

(12) United States Patent  
Whitney

(10) Patent No.: US 7,872,201 B1  
(45) Date of Patent: Jan. 18, 2011

(54) SYSTEM AND METHOD FOR PROGRAMMING A WEIGHING SCALE USING A KEY SIGNAL TO ENTER A PROGRAMMING MODE

(75) Inventor: Ryan S. Whitney, Essex Junction, VT (US)

(73) Assignee: Edlund Company, LLC, Burlington, VT (US)

( * ) Notice: Subject to any disclaimer, the term of this patent is extended or adjusted under 35 U.S.C. 154(b) by 289 days.

(21) Appl. No.: 12/183,399

(22) Filed: Jul. 31, 2008

Related U.S. Application Data

(60) Provisional application No. 60/952,947, filed on Jul. 31, 2007.

(51) Int. Cl.  
G01G 23/01 (2006.01)

(52) U.S. Cl. .................. 177/25.13; 177/50; 702/101

(58) Field of Classification Search ... 177/25.13–25.17, 177/50, 125; 702/101, 102; 73/1.13, 1.15  
See application file for complete search history.

(56) References Cited

U.S. PATENT DOCUMENTS

| 4,313,509 A | * | 2/1982 | Engels ........................ 177/50 |
| 4,328,874 A | * | 5/1982 | Gumberich et al. ...... 177/25.14 |
| 4,412,591 A | * | 11/1983 | Reichmuth et al. ............. 177/1 |
| 4,586,575 A | | 5/1986 | Muerdter et al. |
| 4,723,613 A | * | 2/1988 | Garlen et al. .................. 177/50 |
| 4,782,904 A | * | 11/1988 | Brock ......................... 177/185 |
| 4,841,280 A | | 6/1989 | Hermann et al. |
| 5,567,918 A | | 10/1996 | Bachmann et al. |
| 5,589,670 A | | 12/1996 | Berli |
| 5,710,706 A | | 1/1998 | Markl et al. |
| 6,069,324 A | | 5/2000 | Shimizu et al. |
| 6,080,938 A | * | 6/2000 | Lutz ......................... 177/25.15 |
| 6,215,078 B1 | * | 4/2001 | Torres et al. .............. 177/25.15 |
| 6,777,625 B2 | | 8/2004 | Oldendorf |
| 6,794,586 B1 | * | 9/2004 | Mason ..................... 177/25.15 |
| 6,884,946 B2 | | 4/2005 | Miller et al. |
| 6,970,094 B2 | | 11/2005 | Yamashita et al. |

* cited by examiner

Primary Examiner—Randy W Gibson  
(74) Attorney, Agent, or Firm—Downs Rachlin Martin PLLC

(57) ABSTRACT

A programmable weighing scale and a system and method for programming values of adjustable operating parameters used in generating the displayed output from the weighing scale. The weighing scale is placed into a restricted-access programming mode, which allows an authorized programmer to select values of operating parameters that allow the programmer to initially set or change the service characteristics of the scale. Operating parameters that can be varied include variables used in sampling the weighing scale's transducer electrical output, mathematically processing that output, and displaying the results. Once the operating parameter values have been selected, the weighing scale will utilize those values until the weighing scale undergoes a subsequent reprogramming.

27 Claims, 6 Drawing Sheets

SYSTEM AND METHOD FOR PROGRAMMING A WEIGHING SCALE USING A KEY SIGNAL TO ENTER A PROGRAMMING MODE

RELATED APPLICATION DATA

This application claims the benefit of priority of U.S. Provisional Patent Application Ser. No. 60/952,947, filed Jul. 31, 2007, and titled "System And Method For Programming A Weighing Scale," which is incorporated by reference herein in its entirety.

FIELD OF THE INVENTION

The present invention generally relates to the field of weighing scales. In particular, the present invention is directed to a system and method for programming an electronic weighing scale.

BACKGROUND

One type of electronic weighing scale utilizes a resistive strain gauge type load cell for determining the weight of a mass being weighed. This type of scale is used in many settings, such as the food service industry where these scales are used, for example, for portion control and for measuring ingredients of food recipes. Portion control is important to many food service organizations, such as franchised restaurants, where the portions of certain ingredients, for example, weight of meat used in a particular sandwich or weight of ice cream used in a certain size cone, provided to a customer must be tightly controlled to maintain profitability. Regarding the measuring of ingredients, when bakers and cooks follow carefully proportioned recipes, they must use the proper amount of certain ingredients. Sometimes the ingredients can be readily measured by weight using a weighing scale.

Electronic weighing scales manufactured for the food service industry typically have fixed capacities in the 2-pound to 10-pound range. Generally, a scale customer will select the capacity of the scale based on the food and/or drink item(s) they will be weighing with the scale. In addition to selecting the capacity of a scale, scale customers sometimes like their scales to be customized in various other ways, such as the responsiveness of the scale display to the change in weight being placed on the scale at a particular time. For example, a customer that uses a scale to weigh meat for a certain size sandwich does not want a quick response because the tradeoff is increased sensitivity to small disturbances. On the other hand, a customer that weighs liquids as they are poured wants a much quicker response.

The functioning of conventional load-cell-based scales is typically controlled by software that is burned into hardware memory onboard the scale. To the best of the present inventor's knowledge, conventional electronic weighing scales are customized by burning differing software into the hardware memories to provide the scales with the desired service characteristics (capacity, responsiveness, etc.). Drawbacks of this type of customization include the limitation that service characteristics of these scales cannot be changed without changing the hardware, and customization can be performed only at the time of manufacture. Consequently, scale manufacturers must manufacture a variety of hard-programmed scales of differing service characteristics, and scale merchants typically need to keep an inventory of the differently programmed scales.

SUMMARY OF THE DISCLOSURE

In one implementation, the present disclosure is directed to a system. The system includes a weighing scale having weighing functionality controlled by an operating parameter and having stored thereon a plurality of differing values of the operating parameter, the weighing scale having a controller operatively configured to enter a programming mode so as to allow a programmer to set a value of the operating parameter by electronically selecting from among the plurality of differing values stored on the weighing scale.

In another implementation, the present disclosure is directed to a system. The system includes a weighing scale having an operating mode, a programming mode, and a weighing functionality controlled by an operating parameter, and having stored thereon a plurality of differing values of the operating parameter, the weighing scale including: a controller responsive to a programming mode signal so as to change the weighing scale from operating mode to programming mode; and a power port for receiving external electrical power for powering the weighing scale; an electronic key unit, external to the weighing scale, operatively configured to generate a key signal; and an electrical conduit electrically coupling the electronic key unit to the power port during use so as to provide the key signal to the controller.

In still another implementation, the present disclosure is directed to a method of programming a weighing scale. The method includes providing a weighing scale having weighing functionality controlled by at least one operating parameter and having stored thereon a plurality of differing values of the operating parameter; causing the weighing scale to enter a programming mode that allows a user to select from among the plurality of differing values for the operating parameter; and electronically selecting, during the programming mode, a desired one of the plurality of differing values from among the plurality of differing values so as to set the operating parameter.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

DETAILED DESCRIPTION

The present disclosure is directed to a system and method for programming an electronic weighing scale and a weighing scale having such programmability. This programmability can allow a scale manufacturer to manufacture scales having a common set of operating instructions and then, post-manufacture, set the service characteristics of each scale so as to customize that scale to a desired specific application. This programmability can also allow a scale's service characteristics to be changed from an existing setting to a new setting that may be more appropriate for a future intended use of the scale, which may be different from a current or prior use.

As will become apparent from reading this entire disclosure, this programmability will typically, but not necessarily, have limited accessibility that is restricted to an authorized person, persons or other entity so as to ensure, for example, the integrity of the scale's functionality and to inhibit inadvertent changes in service characteristics. As described below in more detail, such limited accessibility can be achieved by providing a scale made in accordance with the present disclosure with "hidden" software code that enables the programmability and that is unknown or otherwise inaccessible to and/or non-activatable by the end-user of the scale, i.e., the person(s) using the scale as a weighing device. Limited accessibility to the programmability software code can be provided, for example, by lockable switches, unusual combinations of key strokes and/or simultaneous pressing or activation of control buttons or switches, hidden controls on touch screens, separate specialized physical or electronic devices, or other suitable methods or devices. The word "authorized" means approved, accepted, or having clearance, inasmuch as not every user, especially the end-user, of a weighing scale made in accordance with the present disclosure may be authorized to access the programming mode to alter scale service characteristics.

Figure 1:
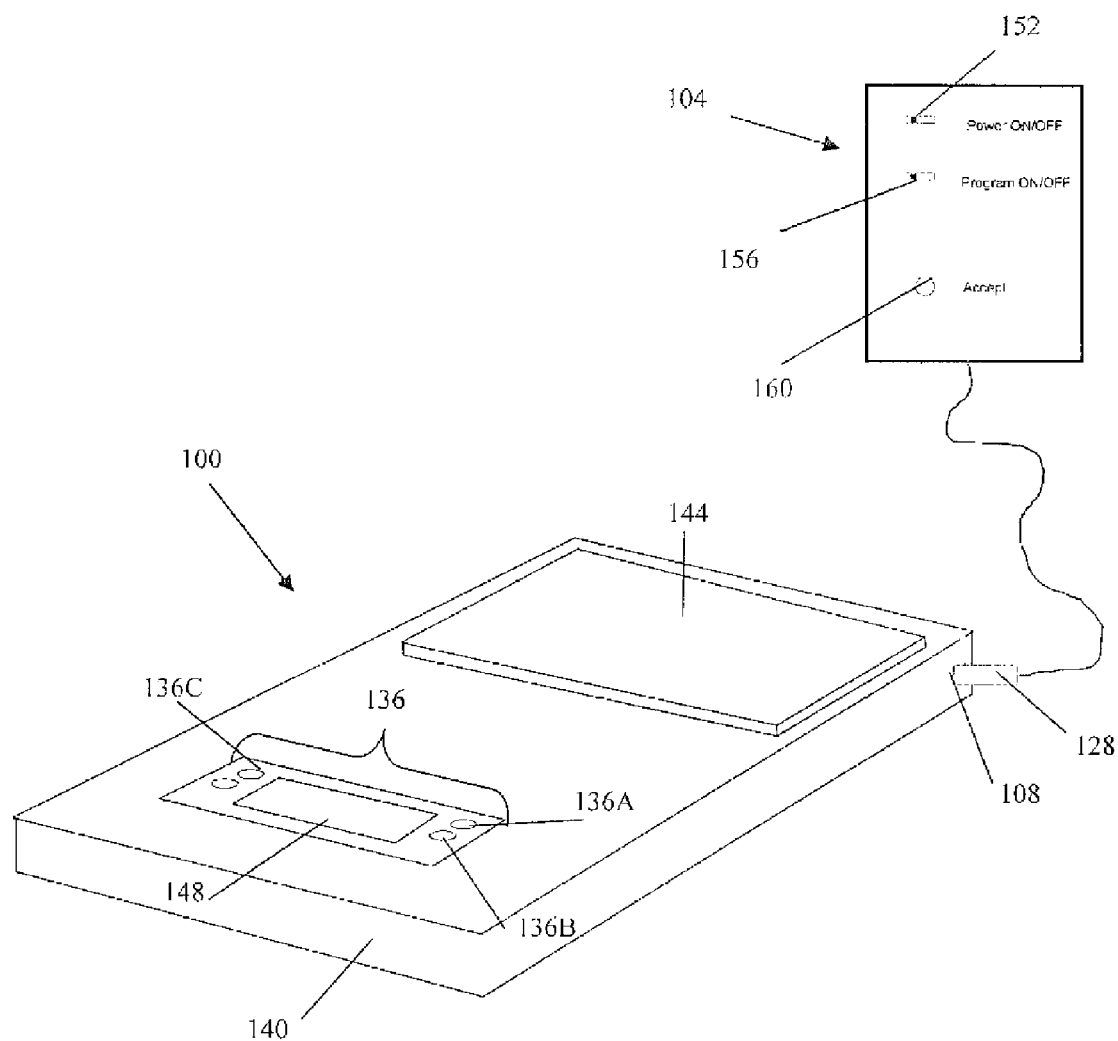
FIG. 1 is a perspective view of a programmable electronic weighing scale and a scale parameter programming box electrically connected to the scale.
Figure 2:
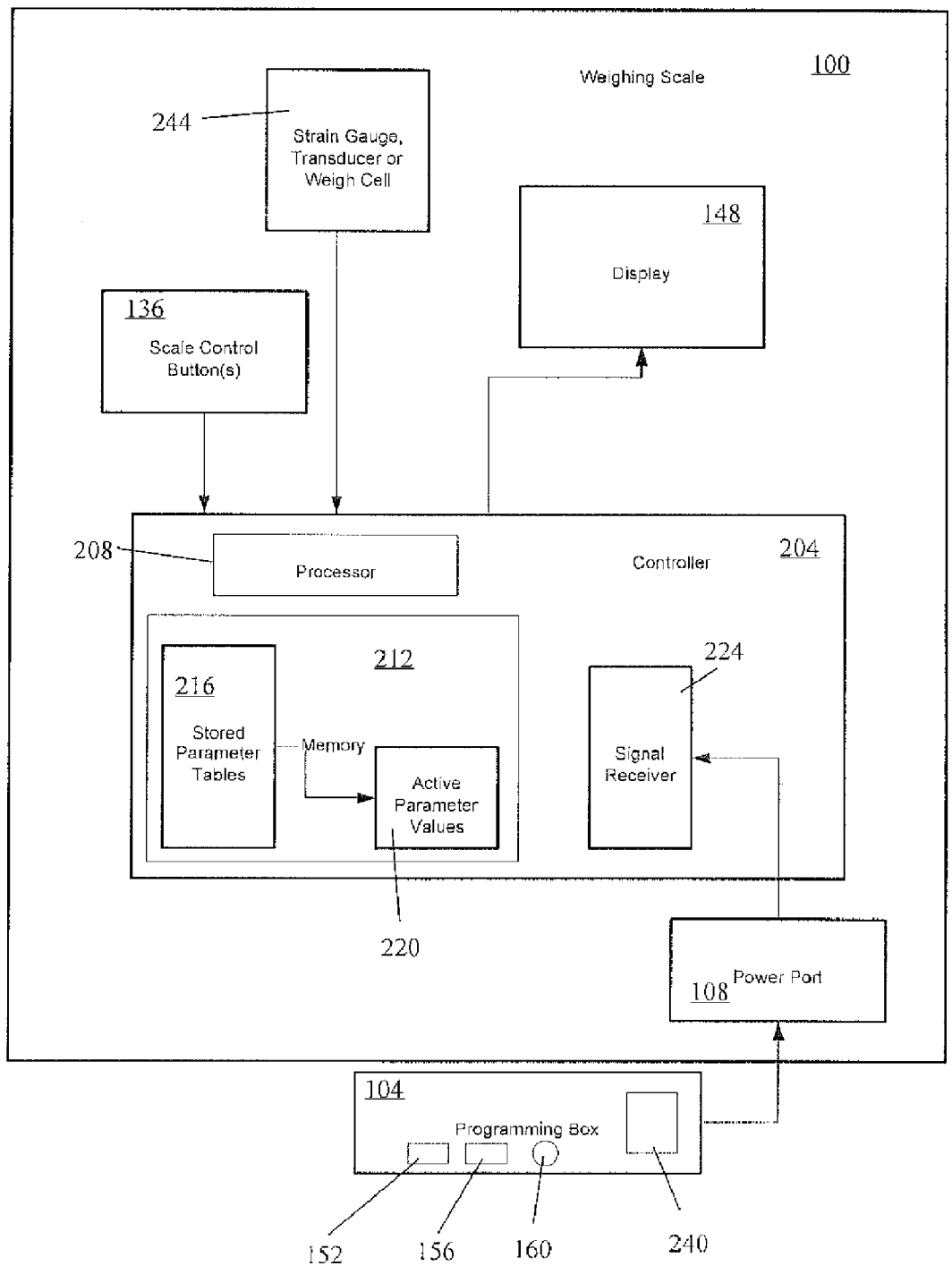
FIG. 2 is a high-level schematic diagram of the scale and programming box of FIG. 1 illustrating some of the electronics of the scale and programming box.

Referring now to the drawings, FIGS. 1 and 2 illustrate one example of programmable electronic weighing scale 100 having "hidden" programming functionality that is controllably accessible so as to allow a programmer to customize one or more service characteristics of the scale. In this context, a "programmer" is any person or other entity that is authorized to access the programming functionality and is capable of using this functionality to set or change the service characteristics of scale 100. In this particular example, the controllable access to the programming functionality is enabled by a programming box 104 that is physically separate from scale 100 but in operative communication therewith, here, by a wired connection. As described below in more detail, a function of programming box 104 is to provide a "key" signal that, in effect, unlocks the hidden programming functionality so as to allow a programmer (not shown) to either initially set the scale's service characteristics or change the scale's service characteristics if the characteristics have already been set at least once. It is again noted that while this example includes programming box 104 that unlocks or enables the programming functionality of scale, there are other ways of unlocking or enabling this functionality, including the lockable switches, unusual combinations of key strokes and/or simultaneous pressing or activation of control buttons or switches, and hidden controls on touch screens mentioned above.

In this example, scale 100 is of a dual-power-source type that can be powered by one or more internal batteries (not shown) or by an externally supplied AC voltage from, for example, a standard domestic 120 VAC outlet passed through a DC converter. Consequently, scale 100 includes a DC power port 108 for receiving a power plug (not shown) of such a converter. An example of dual-power scale design suitable for use with scale 100 is disclosed in U.S. patent application Ser. No. 11/744,039, filed on May 3, 2007, and titled "Weighing Scale Having Dual Housings," which is incorporated herein by reference for all that it discloses relative to scale design and scale component layout and selection. Of course, those skilled in the art will readily appreciate that scale 100 may readily be of a design different than the design disclosed in the above-referenced patent application.

As shown in FIG. 2, electronic weighing scale 100 includes a controller 204 that controls the functioning of the scale not only during weighing operations but also during programming operations. As those skilled in the art will readily appreciate, controller 204 may include a processor 208, such as an application specific integrated circuit (ASIC) or other microprocessor, and memory 212 (which can be integral with the processor) that stores machine-executable instructions (not shown) and parameter tables 216 that allow the processor to control the functionality of scale 100 and provide the scale with its service characteristics. As described in more detail below, parameter tables 216 contain sets of selectable parameter values that a programmer can select during programming of scale 100 when customizing the service characteristics (capacity, responsiveness, etc.) of the scale. Briefly, the programming of scale 100 may be considered to include the selection by the programmer of desired values of parameters from the sets of values in parameter tables 216 so as to create a set of active parameter values 220 that the scale will use in controlling the scale after programming.

FIGS. 1 and 2 show that, in this example, programming box 104 is in electrical communication with electronic weighing scale 100 via an electrical connection/plug 128 that electrically couples with DC power port 108 located on the side of the scale. As described below in more detail in connection with FIGS. 4-6, a function of programming box 104 is to generate a programming signal of a certain frequency or other characteristic(s) that controller 204 is programmed to recognize and distinguish from the normal DC power, for example via a signal receiver 224. When controller 204 detects the signal, scale 100 enters a programming mode. This signal may be thought of as a "key" signal that unlocks the customizability/programmability of scale 100, and puts the scale into programming mode.

Once scale 100 is in programming mode, the programmer uses one or more buttons and/or other input devices to select the desired parameter values to set active parameter values 220. In this embodiment, a set of buttons 136 on scale 100 itself are used during programming as described below in more detail relative to FIGS. 4-6. However, in other embodiments, the programmer input device(s) used for programming may be on an external programming box, such as programming box 104, or one or more of the devices may be on scale 100 while one or more others may be on the external programming box.

Figure 3:
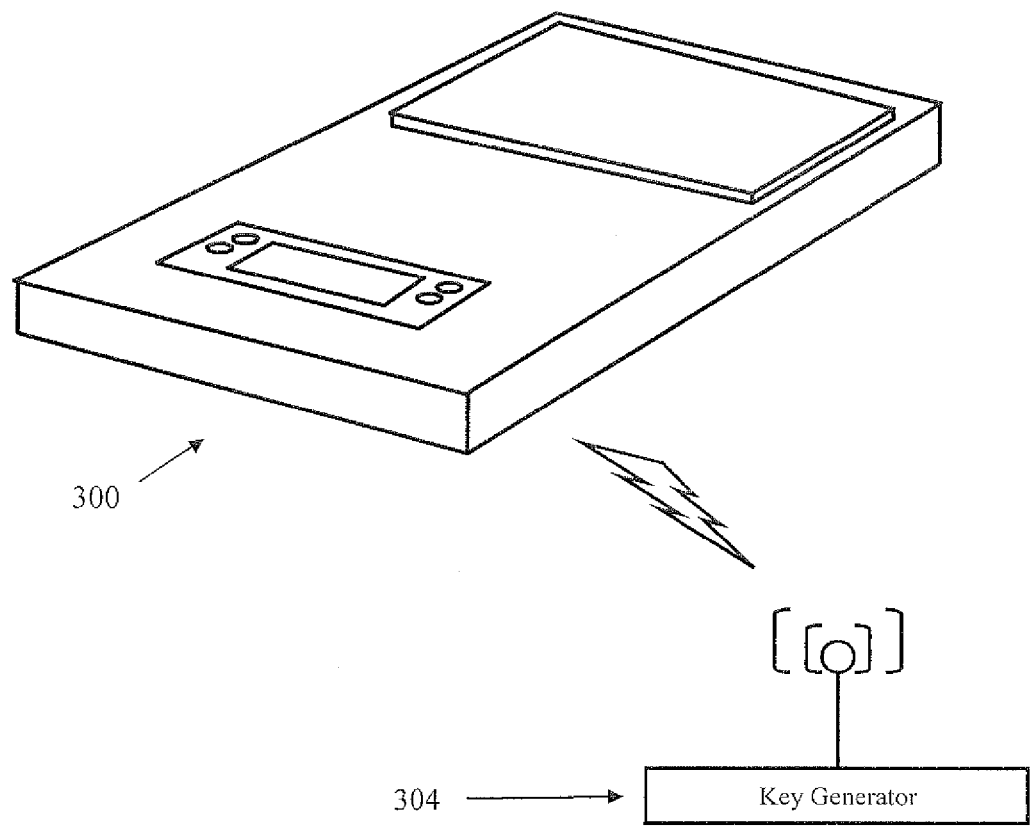
FIG. 3 is an isometric view of an electronic weighing scale in wireless communication with a programming box.

In addition, and as shown in FIG. 3, if the system at issue includes a programmable weighing scale 300 and external programming box 304, communication between the scale and programming box may be wireless using any suitable wireless communication standard, such as Bluetooth or HomeRF, among others. In all respects other than the wireless communication, scale 300 and programming box 304 may be the same as or similar to, respectively, scale 100 and programming box 104 of FIGS. 1 and 2, as desired. Before describing a method that exemplifies the programming of a programmable weighing scale of the present disclosure, for the sake of clarity and context immediately below is a brief description of other components of example weighing scale 100.

Referring again to FIGS. 1 and 2, programmable weighing scale 100 includes a base 140, a weight receiver 144 for receiving the thing(s) (not shown) to be weighed by the scale, and a display 148 for displaying information to a user or other person, such as weight, a mode indicator, parameter values and type, power status, etc. The weight of things placed upon weight receiver 144 will be shown on display 148. Display 148 may be of any well-known type of display, such as an LED, OLED, or LCD display, among others. Various non-programming scale controls are activated through use of buttons 136 located, in this example, on either side of the display 148. In this embodiment, buttons 136 include an On/Off button 136A, a Tare button 136B, and a Units Selection button 136C, but it should be understood that the present disclosure is in no way limited to just these examples. In an example of a simple programmable weighing scale (not shown), such scale may have only an On/Off button available to an end-user during use of the scale for weighing. In such case, if an external programming box is used to enable the programmability functionality, programming can be effected by various controls on/in the associated programming box (not shown, but could be akin to programming box 104). For example, the controller of such a one-button scale may be configured to recognize and respond to differing signals that may themselves be used to change the active parameters of the scale or may be used to temporarily change the functionality of the On/Off button among multiple functions while the scale is in the programming mode. Those skilled in the art should be able to devise suitable ways for allowing a programmer to select the active parameter values when working within constrains of various scale designs.

Programming box 104 illustrated in FIGS. 1 and 2 incorporates various controls for use in controlling the box itself and its functionality. In this example, programming box 104 includes a Power On/Off switch 152, a programming signal On/Off switch 156, and a programming Accept button 160. The use of controls 152, 156, 160 is discussed in more detail below in connection with FIGS. 4-6. Controls 152, 156, 160 are in electrical communication with programming box circuitry 240 within programming box 104 that is suitable for performing the necessary functions of the box as described below. Those skilled in the art will understand how to design controller 204 of weighing scale 100 and programming box circuitry 240 based on the functionality described herein, such that describing further details of these circuitries is not necessary for those skilled in the art to implement the functionality. It is noted, too, that controller 204 of weighing scale 100 and programming box circuitry 240 may be implemented using software or any suitable combination of software and hard-wired circuitry. Other control mechanisms besides mechanical buttons and switches, such as soft buttons and other soft controls on a touch screen, among others, are also contemplated in this disclosure, as would be known to someone with ordinary skill in the art.

In this embodiment, power on/off switch 152 controls electrical power to programming box circuitry 240. This power may come from, for example, an internal battery (not shown) or external power supply (not shown). This power is used to generate the key or programming signal that is received by programmable weighing scale 100 and places the scale into programming mode. Programming signal On/Off switch 156 (or key signal switch) starts the initiation for the programming sequence. Accept button 160 is used to accept the changes made to each parameter and proceed to the next parameter. This process is continued until all of the parameters that are accessed through the programming mode have been confirmed. Finally, pushing accept button 160 returns scale 100 to its normal weighing mode. An example of the use of controls 152, 156, 160 is described below in connection with FIG. 5.

In this particular example, programming box 104 generates a 16 Hz key signal that is received by signal receiver 224 of weighing scale 100 and which the signal receiver is configured to recognize as the key signal and distinguish from the DC externally-supplied power that can be used to power the scale. Those skilled in the art will readily appreciate that a frequency other than 16 Hz may be used with suitable configuration of signal receiver 224. In this example, the programming box programming On/Off switch 156 and Accept button 160 are both used to activate programming box circuitry 240 to generate the 16 Hz signal. The precise response of scale 100 to receiving the 16 Hz key signal will vary as a function of the programming of scale. However, generally, the presence of this key signal causes weigh scale 100 to enter into programming mode and, while in programming mode, to prompt programming subroutines to accept and store values of selected parameters for use in scale weighing operations, and finally to exit programming mode and place the scale back in weighing mode. The scale uses the selected parameter values in generating the output for scale display 148 while in weighing mode.

As a bit of background, the weight displayed by an electronic weighing scale, such as programmable weighing scale 100 (FIGS. 1 and 2), is a function of the mass being weighed, but until the display (here, display 148) reaches steady state, the displayed value is also a function of the sampling parameters of controller (here, controller 204) that connects signal from the strain gauge (here, strain gauge 244 (FIG. 2) to the display, as well as the dynamic behavior of the strain gauge and associated circuitry. One manner in which the displayed weight reading may delay reaching steady state is when the number of significant figures utilized by the display interacts with the accuracy and sensitivity of the voltage sensing device. The display's least significant digits may fluctuate, and so appear to never stabilize. This can be managed by careful selection of the number of significant digits displayed, as well as with filtering and averaging circuitry (not particularly shown, but, in the example of scale 100 of FIGS. 1 and 2, included in controller 204).

The filtering and averaging circuitry requires certain parameters, such as the rate at which the display updates from the strain gauge resistance, the rate that strain gauge resistance data is polled, and the number of discrete data readings used to calculate a moving average. These parameters will also influence the rate at which a steady state display value is reached, and the apparent display sensitivity to electronic noise or true load variations on the strain gauge. Electronic scales may also utilize other display parameters, such as a scaling parameter for altering the apparent range of the display, or a conversion parameter for altering the weight units with which the scale reading is displayed.

An important feature of many electronic scales, including programmable weighing scale 100 of FIGS. 1 and 2, is the ability to account for tare weight, or zero the display, when a small load causes a slight resistance change reading from the strain gauge. This permits a user to make allowance for the weight of a container, and display only the weight change between an empty and a filled container. Similarly, it permits a user to operate the scale without having a perfectly clean weighing pan, effectively subtracting out the weight of residual mass on the scale. This feature may also be controlled by selected parameters which define the weights, i.e. strain gauge resistances, for which the scale will permit setting the tare. This allows the scale designer to prevent setting tare if there is an unexpectedly large weight on the scale, and to allow automatically setting tare if the strain gauge resistance is within a preset but small range.

Figure 4:
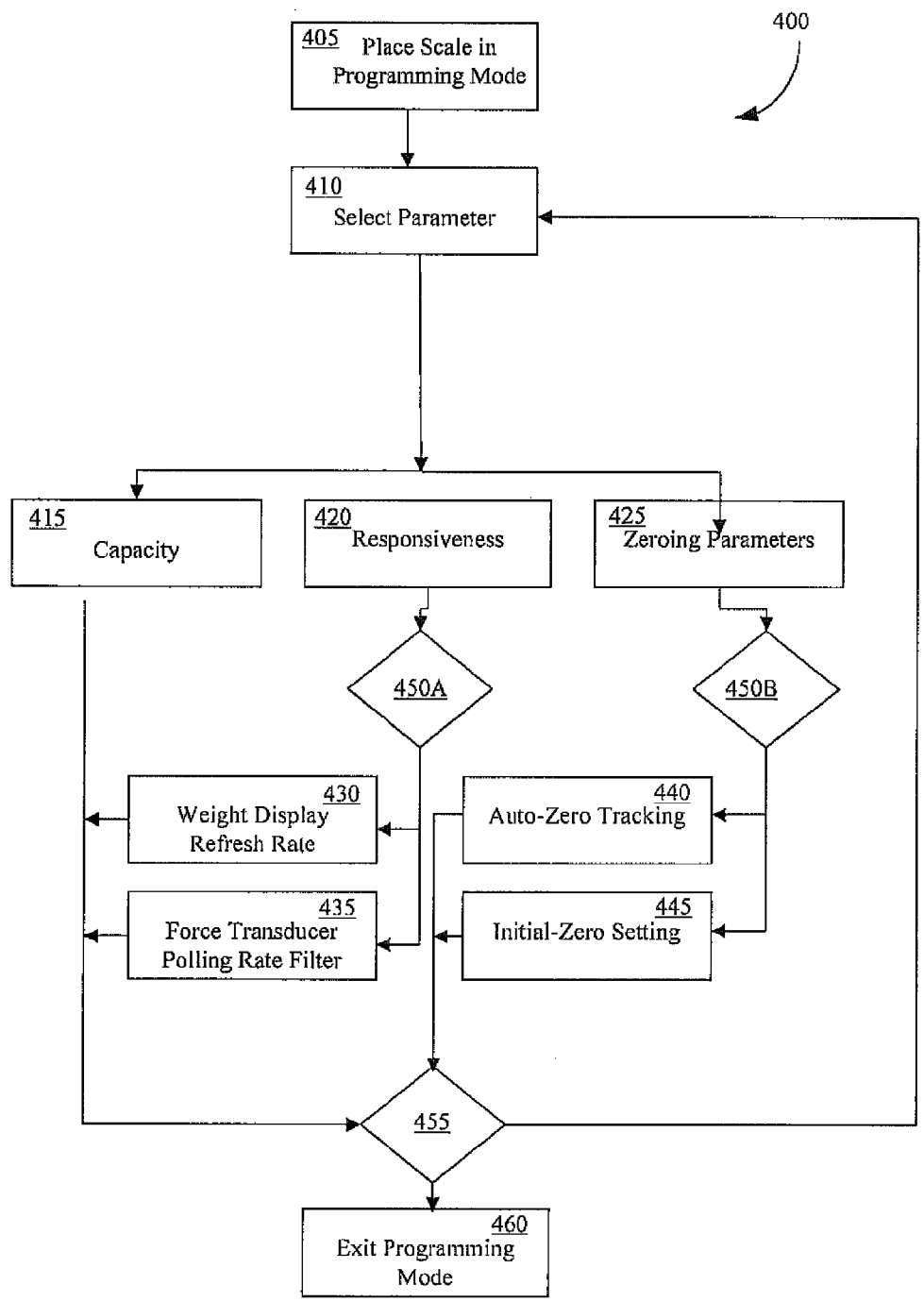
FIG. 4 is a generalized flow chart of a programming process for changing some electronic scale display parameters.

With that background in mind, FIG. 4 illustrates at a very high level an exemplary method 400 of selecting desired values for five parameters that affect the service characteristics of a programmable electronic scale, such as scale 100 of FIG. 1. Further details of how some of the general steps of method 400 may be carried out are described below in connection with FIGS. 5 and 6. For convenience, scale 100 is used to illustrate the various steps of method 400. However, it should be understood that the same steps could be used for a scale different from scale 100 but having a set of buttons or other input devices similar to buttons 136A, 136B, and 136C of the scale of FIG. 1. In addition, those skilled in the art will recognize how to generalize the steps of method 400 to scales and/or external programming units having much different input devices.

At step 405, a programmer places programmable weighing scale 100 into programming mode. At step 410, the programmer makes a first step of selection. Since various parameters are related and can be grouped or categorized, this first decision point is to select the desired parameter group. Three groups are shown, in accordance with the prior discussion of resistance strain gauge load cell based electronic weighing scales: capacity 415; scale responsiveness 420; and scale zeroing parameters 425. The capacity group 415 has only a single parameter (i.e., capacity), whereas the scale responsiveness group 420 and the scale zeroing group 425 both have two parameters each, namely, weight display refresh rate (block 430) and force transducer polling rate (block 435) for responsiveness 420 and auto-zero tracking (block 440) and initial-zero setting (block 445) for zeroing parameters 425. Thus, a second step of selection must be made for any group with more than one programmable parameter. In the present example, steps 450A-B represents parameter selection for groups containing a plurality of parameters. After a parameter value is selected, step 455 allows the programmer to loop back and select another group (i.e., loop back to step 410) and that group's associated parameter(s), or to exit programming mode in step 460.

Figure 5:
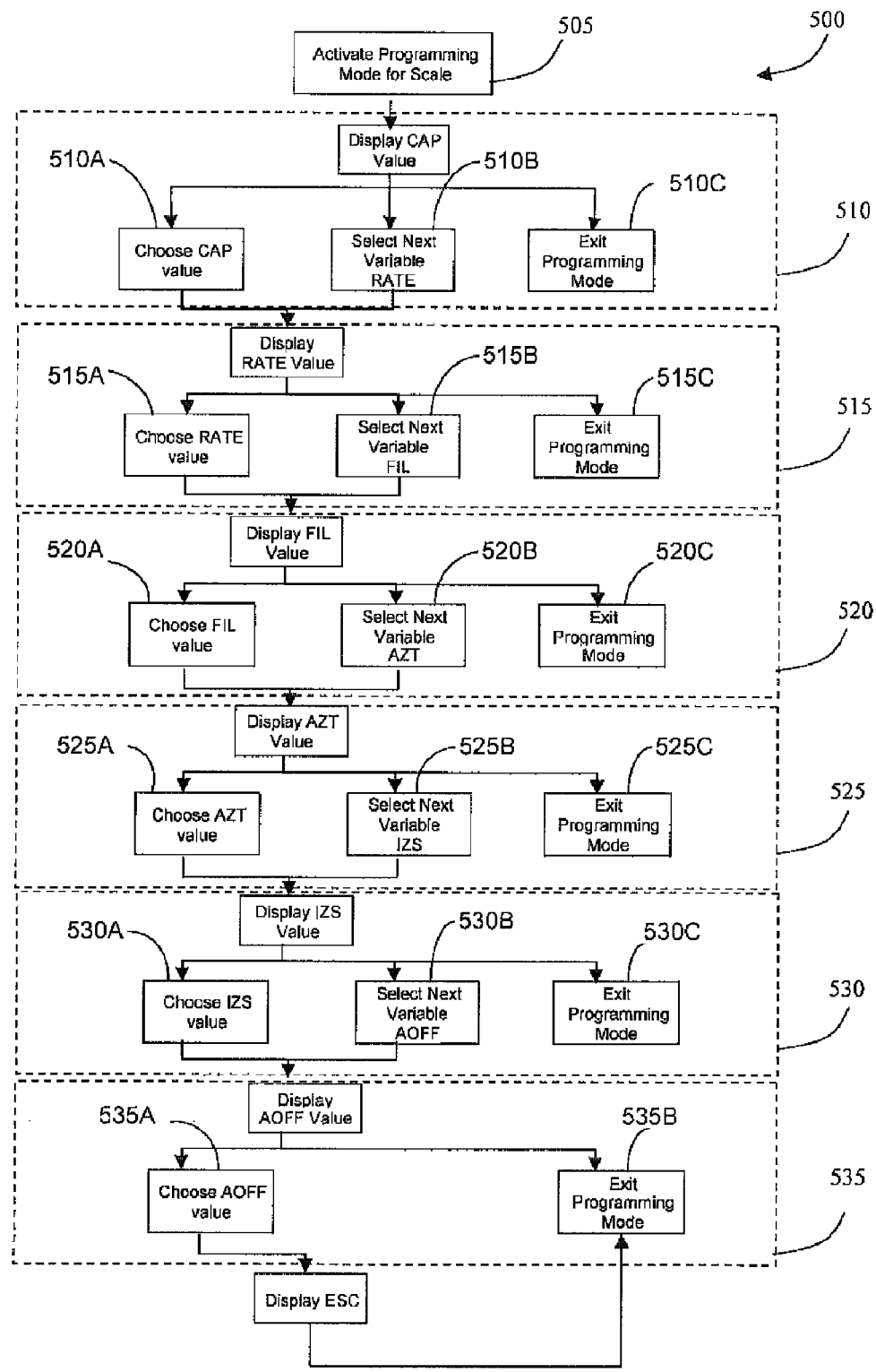
FIG. 5 is a flowchart of one specific method of accessing the programming mode of an electronic weighing scale.

FIG. 5 illustrates an exemplary sequential scale programming process 500 that utilizes only a single control on a programmable weighing scale. Scale 100 of FIGS. 1 and 2 will again be used as an illustration. In this example, the button utilized in programming process is On/Off/Tare button 136A, and the scale is initially powered off, as is programming box 104. At step 505, the programmer powers up scale 100 by pushing On/Off/Tare button 136A, and powers up programming box 104 using its power switch 152. If the programming box and corresponding scale utilize wireless communications, this data link may automatically be established according to the appropriate coupling process of the wireless protocol used. The programmer then activates programming signal switch 156 of programming box 104 to place scale 100 into programming mode by sending the key signal to the scale. This advances process 500 to step 510 at which the programmer may begin selecting values for the various parameters.

Figure 6:
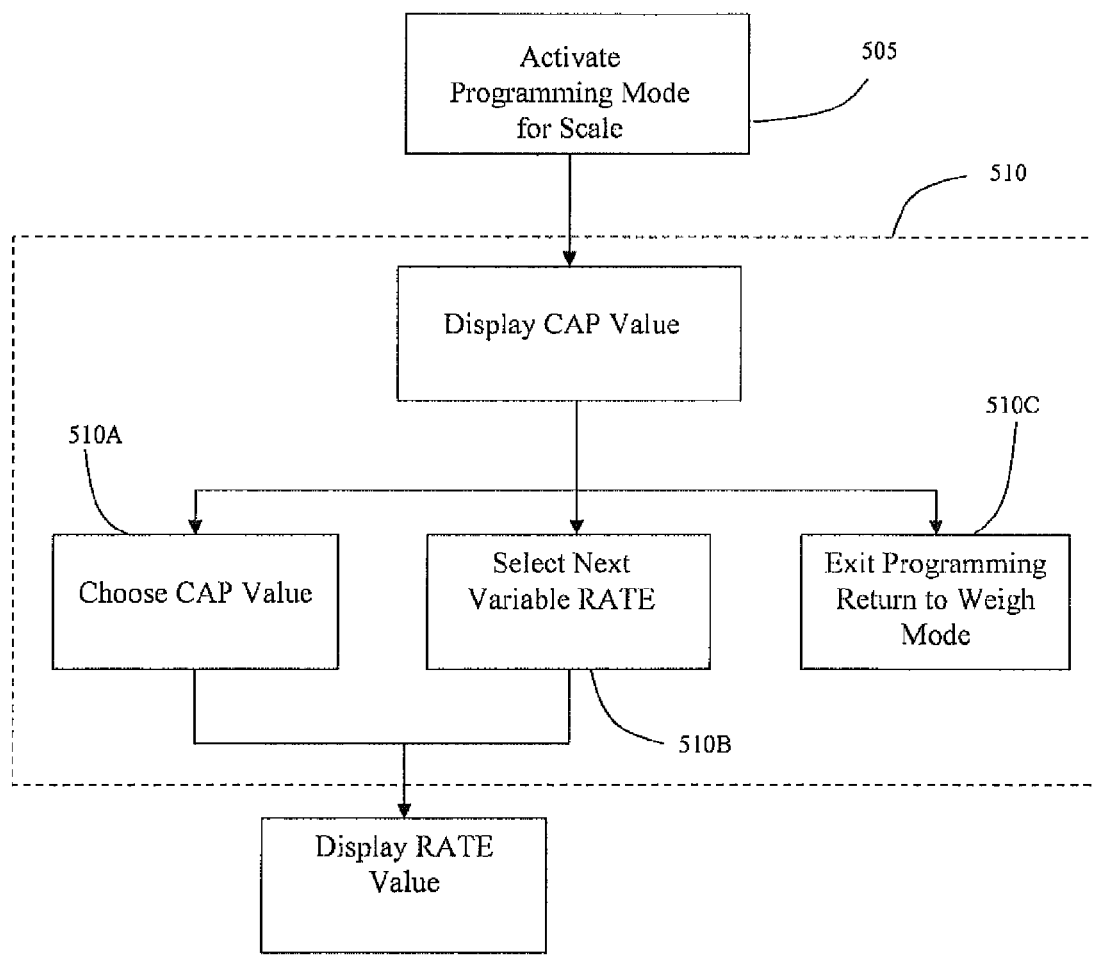
FIG. 6 is a view of a section of the flowchart from FIG. 5 in greater detail.

As seen in FIG. 5, after step 505, process 500 is configured to step through the five parameters, that is, capacity ("CAP"), display refresh rate ("RATE"), force transducer polling rate ("FIL"), auto-zero tracking ("AZT") and initial-zero setting ("IZS"), at, respectively, steps 510, 515, 520, 525, 530. At step 535, process 500 allows the programmer to select a value for an auto-off or power-saving parameter ("AOFF"). At each of steps 510, 515, 520, 525, 530, the programmer has the choices of choosing a value for the current parameter (steps 510A, 515A, 520A, 525A, 530A, respectively), selecting the next parameter (steps 510B, 515B, 520B, 525B, 530B, respectively) or choosing to exit the program mode (steps 510C, 515C, 520C, 525C, 530C, respectively). FIG. 6, described below, illustrates how each of steps 510, 515, 520, 525, 530 can be navigated during programming using a single key on programmable weighing scale 100. As seen in FIG. 6, the example shown is for capacity 510. However, display refresh rate 515, force transducer polling rate 520, auto-zero tracking 525 and initial-zero setting 530 are similar, only the parameter at issue and the parameter values differ as between the various steps.

Referring to FIG. 5, the programmer may choose to select a value for the capacity parameter at step 510A on step 510. While arriving at step 510, display 148 of programmable weighing scale 100 (FIG. 1) will display the identifier "CAP", as well as show the current value of the capacity parameter. Then at step 510 the programmer may toggle display 148 through the several capacity value selections in step 510A, skip to the next variable selection in step 510B, or exit programming mode in step 510C. The capacity parameter will have a finite number of value choices, for example, 2000 grams, 5000 grams, and 10000 grams. When the programmer has arrived at the desired capacity value, the programmer accepts the value by pressing Accept button 160 on programming box 104. If the programmer is satisfied with the value selected at step 510A or did not need to change the capacity value, the programmer may choose to proceed to the next parameter at step 510B (here, the refresh rate parameter) or may choose to exit programming mode at step 510C.

Unless the programmer chose to exit process 500 at step 510C, the process proceeds to step 515 wherein the programmer may select a desired value for the refresh rate parameter. While on step 515, display 148 of programmable weighing scale 100 (FIG. 1) will display the identifier "RATE", as well as show the current value of the refresh rate parameter. Then at step 515A the programmer may toggle display 148 through the several refresh rate value selections. The refresh rate parameter will have a finite number of value choices, for example, the set of integers from 1 to 25, with "1" representing the slowest refresh rate and "25" representing the fastest refresh rate. In alternative embodiments, the values may be actual refresh frequencies. When the programmer has arrived at the desired refresh rate value, the programmer accepts the value by pressing Accept button 160 on programming box 104. If the programmer is satisfied with the value selected at step 515A or did not need to change the refresh rate value, the programmer may choose to proceed to the next parameter through step 515B (here, the force transducer polling rate parameter) or may choose to exit programming mode via step 515C.

Unless the programmer chose to exit process 500 at step 515C, the process proceeds to step 520 wherein the programmer may select a desired value for the force transducer polling rate parameter. While on step 520, display 148 of programmable weighing scale 100 (FIG. 1) will display the identifier "FIL", as well as show the current value of the polling rate parameter. Then at step 520A the programmer may toggle display 148 through the several polling rate value selections. The polling rate parameter will have a finite number of value choices, for example, integers 0-15. These values have arbitrary units, and control the polling of the force transducer. Alternatively, the values could represent the additional number of transducer readings used in a moving-average filter, with "0" representing an unfiltered reading. When the programmer has arrived at the desired polling rate value, the programmer accepts the value by pressing Accept button 160 on programming box 104. If the programmer is satisfied with the value selected at step 520A or did not need to change the polling rate value, the programmer may choose to proceed to the next parameter at step 520B (here, the auto-zero tracking parameter) or may choose to exit programming mode at step 520C.

Unless the programmer chose to exit process 500 at step 520C, the process proceeds to step 525 wherein the programmer may select a desired value for the auto-zero tracking parameter. While on step 520, display 148 of programmable weighing scale 100 (FIG. 1) will display the identifier "AZT", as well as show the current value of the auto-zero tracking parameter. Then at step 525A the programmer may toggle display 148 through the several auto-zero tracking value selections. The auto-zero tracking parameter will have a finite number of value choices, for example, 0.0 to 0.3 ounces, representing the window of transducer output for which the auto-zero feature will function. For example, if the parameter is set at 0.3 ounces, and the scale reads 0.2 ounces, due to a small residual weight left on the scale, the auto-zero feature will automatically rezero the scale while still carrying the residual weight. If the residual weight were 0.5 ounces, the auto-zero function would not rezero the scale, since the residual reading falls outside the parameter-defined window. When the programmer has arrived at the desired auto-zero tracking value, the programmer accepts the value by pressing Accept button 160 on programming box 104. If the programmer is satisfied with the value selected at step 525A or did not need to change the auto-zero tracking rate value, the programmer may choose to proceed to the next parameter at step 525B (here, the initial-zero tracking parameter) or may choose to exit programming mode at step 525C.

Unless the programmer chose to exit process 500 at step 525C, the process proceeds to step 530 wherein the programmer may select a desired value for the initial-zero tracking parameter. While on step 530, display 148 of programmable weighing scale 100 (FIG. 1) will display the identifier "IZS", as well as show the current value of the initial-zero tracking parameter. Then at step 530A the programmer may toggle display 148 through the several initial-zero tracking value selections. The initial-zero tracking parameter will have a finite number of value choices, for example, 0.0 to 0.8 ounces, representing the window of transducer output for which the initial-zero setting feature will function. For example, if the parameter is set at 0.8 ounces, and the scale reads 0.7 ounces on startup due to an empty container being left on the scale, the initial-zero setting feature will automatically rezero the scale while still carrying the residual weight of the empty container. If the residual weight were 1.5 ounces, the auto-zero function would not rezero the scale, since the residual reading falls outside the parameter-defined window. When the programmer has arrived at the desired initial-zero tracking value, the programmer accepts the value by pressing Accept button 160 on programming box 104. If the programmer is satisfied with the value selected at step 530A or did not need to change the initial-zero tracking rate value, the programmer may choose to proceed to the next parameter at step 530B (here, the auto-off parameter) or may choose to exit programming mode at step 530C.

Unless the programmer chose to exit process 500 at step 530C, the process proceeds to step 535 wherein the programmer may select a desired value for the auto-off parameter. While on step 530, display 148 of programmable weighing scale 100 (FIG. 1) will display the identifier "AOFF", as well as show the current value of the auto-off parameter. Then at step 535A the programmer may toggle display 148 through the several auto-off value selections. The auto-off parameter will have a finite number of choices, for example, OFF, 120, 240, 360, and 720, representing the number of seconds the scale will remain on before automatically powering off "OFF" deactivates the auto-off function. When the programmer has arrived at the desired auto-off value, the programmer accepts the value by pressing Accept button 160 on programming box 104. If the programmer is satisfied with the value selected at step 535A or did not need to change the auto-off value, the programmer may choose to exit programming mode at step 535B. In alternative embodiments, process 500 may be modified to cycle back to step 510. This is useful for allowing the programmer to cycle through all of the parameters as many times as needed for the programmer to select all of the desired parameter values.

As mentioned above, FIG. 6 shows step 510 of process 500 of FIG. 5 so as to detail a procedure for programming using a single control button (here, On/Off/Tare button 136A) and a programming box (here, box 104). As described above, a programmer places programmable weighing scale 100 into programming mode at step 505, using programming signal switch 156 of programming box 104. A first activation of On/Off/Tare button 136A will cause scale 100 to advance to step 510. Within step 510, process 500 of FIG. 5 can be broken down into more detailed steps. At step 510, display 148 will display "CAP" so as to indicate the parameter currently under consideration and will also show the current value of the capacity parameter at step 500. Repeated activation of On/Off/Tare button 136A will toggle through the various capacity value selections (step 510A), the "CAP" display (step 510B) that indicates which variable the process is manipulating, and an escape display "ESC" (step 510C) that allows exiting programming mode. Pushing the Accept button on the programming box when the display shows "CAP" will cause the process to pass through step 510 and move to the next variable, at step 515. Pressing the Accept button on the programming box when the display shows "ESC" will cause the scale to pass through step 510 and leave programming mode and return to weighing mode. Pressing the Accept button on the processing box when either of the numerical values are displayed will cause the scale to accept that number as the value for the "CAP" variable, pass through step 505 and progress to the next variable. Steps 515, 520, 525, 530, and 535 are navigated in analogous fashion, with the scale's single control button toggling through options, and the programming box's Accept button used to accept choices and move to subsequent steps.

A scale with two or three control buttons will have more options for navigating a programming process, and so may have more accessible methods to review current parameter values, or to make parameter value selections, and advance through the programming process. For example, a weighing scale may have an On/Off control and a separate Tare control. One of these controls, for instance the Tare button, might be used to exit programming mode at any time in the programming process. Thus other embodiments may have significantly different flowcharts illustrating the navigation of the programming steps. The information for operating the programming mode, as well as the various choices available for parameter selection are always present in the weighing scale circuitry, so the weighing scale may be customized any number of times. Default settings for all parameters may be programmable with the activation of a single control button or simple combination of control buttons. Multiple default parameter settings may be programmer-defined and stored for easy retrieval. For example, one set of default parameter settings may be programmer-defined and saved for weighing of a container being rapidly filled with a liquid, whereas a different set of default settings may be programmer-defined and retrieved for weighing of solids in a windy environment that causes slight fluctuations in the load on the weigh cell.

A scale with two or three control buttons may be manufactured with more options for accessing the programming mode. Rather than using a programming box 104 for generation of a key signal, as described in the prior example, a combination of control buttons held down simultaneously or pushed in a predetermined sequence or a combination thereof could generate a corresponding key signal and place the scale in programming mode. Another example includes a scale with a computer network connection whose programmability may be only accessed through the network connection. Other methods for generating a key signal and thus maintaining limited access to the programmability of the scale may utilize characteristics of the scale, such as touch-screen displays or other features well understood for communicating with an electrical device.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A system, comprising:
a weighing scale having weighing functionality controlled by an operating parameter and having stored thereon a plurality of differing values of the operating parameter, said weighing scale having a controller operatively configured to enter a programming mode so as to allow a programmer to set a value of the operating parameter by electronically selecting from among the plurality of differing values stored on said weighing scale;
wherein:
said weighing scale further includes a power port for receiving external electrical power for powering said weighing scale during use of the weighing functionality and said controller is responsive to a key signal so as to cause said weighing scale to enter the programming mode, said weighing scale further including a signal receiver in electrical communication with said power port so as to receive the key signal; and
the key signal is an AC signal having a frequency and said power port is a DC power port, said signal receiver configured to identify the frequency as corresponding to the key signal.

2. A system according to claim 1, further comprising a signal generator, external to said weighing scale, operatively configured to generate the key signal.

3. A system according to claim 2, wherein said weighing scale includes a first user input interface and the signal generator includes a second user input interface and value selections of the operating parameter are previewed by activating the first user input on said weighing scale and the value of the operating parameter is electronically selected from among the value selections by activating said second user input interface on said signal generator.

4. A system according to claim 1, wherein the operating parameter is weighing capacity.

5. A system according to claim 1, wherein the operating parameter is display refresh rate.

6. A system according to claim 1, wherein the operating parameter is force transducer polling rate.

7. A system according to claim 1, wherein the operating parameter is auto-zero tracking.

8. A system according to claim 1, wherein the operating parameter is initial-zero tracking.

9. A system, comprising:
a weighing scale having an operating mode, a programming mode, and a weighing functionality controlled by an operating parameter, and having stored thereon a plurality of differing values of the operating parameter, said weighing scale including:
a controller responsive to a programming mode signal so as to change said weighing scale from operating mode to programming mode; and
a power port for receiving external electrical power for powering said weighing scale;
an electronic key unit, external to said weighing scale, operatively configured to generate a key signal; and
an electrical conduit electrically coupling said electronic key unit to said power port during use so as to provide the key signal to said controller; and
a signal generator, external to said weighing scale, operatively configured to generate the key signal.

10. A system according to claim 9, wherein said weighing scale has operating parameters whose values are changeable when said weighing scale is in the programming mode.

11. A system according to claim 9, wherein said weighing scale further includes a power port for receiving external electrical power for powering said weighing scale during use, said signal receiver integrated into said power port.

12. A system according to claim 11, wherein the key signal is an AC signal having a frequency and said power port is an DC power port, said signal receiver configured to identify the frequency as corresponding to the key signal.

13. A system according to claim 9, wherein said weighing scale includes a first user input interface and the signal generator includes a second user input interface and value selections of the operating parameter are previewed by activating the first user input on said weighing scale and the value of the operating parameter is electronically selected from among the value selections by activating said second user input interface on said signal generator.

14. A system according to claim 9, wherein the operating parameter is weighing capacity.

15. A system according to claim 9, wherein the operating parameter is display refresh rate.

16. A system according to claim 9, wherein the operating parameter is force transducer polling rate.

17. A system according to claim 9, wherein the operating parameter is auto-zero tracking.

18. A system according to claim 9, wherein the operating parameter is initial-zero tracking.

19. A system, comprising:
a weighing scale having weighing functionality controlled by an operating parameter and having stored thereon a plurality of differing values of the operating parameter, said weighing scale having a controller operatively configured to enter a programming mode so as to allow a programmer to set a value of the operating parameter by electronically selecting from among the plurality of differing values stored on said weighing scale;
wherein said weighing scale further includes a power port for receiving external electrical power for powering said weighing scale during use of the weighing functionality and said controller is responsive to a key signal so as to cause said weighing scale to enter the programming mode, said weighing scale further including a signal receiver in electrical communication with said power port so as to receive the key signal; and
a signal generator, external to said weighing scale, operatively configured to generate the key signal.

20. A system according to claim 19, wherein said weighing scale includes a first user input interface and the signal generator includes a second user input interface and value selections of the operating parameter are previewed by activating the first user input on said weighing scale and the value of the operating parameter is electronically selected from among the value selections by activating said second user input interface on said signal generator.

21. A system according to claim 19, wherein the key signal is an AC signal having a frequency and said power port is a DC power port, said signal receiver configured to identify the frequency as corresponding to the key signal.

22. A system according to claim 19, wherein the operating parameter is display refresh rate.

23. A system according to claim 19, wherein the operating parameter is force transducer polling rate.

24. A system, comprising:
a weighing scale having an operating mode, a programming mode, and a weighing functionality controlled by an operating parameter, and having stored thereon a plurality of differing values of the operating parameter, said weighing scale including:
a controller responsive to a programming mode signal so as to change said weighing scale from operating mode to programming mode; and
a power port for receiving external electrical power for powering said weighing scale;
an electronic key unit, external to said weighing scale, operatively configured to generate a key signal; and
an electrical conduit electrically coupling said electronic key unit to said power port during use so as to provide the key signal to said controller;
wherein:
said weighing scale further includes a power port for receiving external electrical power for powering said weighing scale during use, said signal receiver integrated into said power port; and
the key signal is an AC signal having a frequency and said power port is a DC power port, said signal receiver configured to identify the frequency as corresponding to the key signal.

25. A system according to claim 24, further comprising a signal generator, external to said weighing scale, operatively configured to generate the key signal.

26. A system according to claim 24, wherein said weighing scale includes a first user input interface and the signal generator includes a second user input interface and value selections of the operating parameter are previewed by activating the first user input on said weighing scale and the value of the operating parameter is electronically selected from among the value selections by activating said second user input interface on said signal generator.

27. A system according to claim 24, wherein the operating parameter is force transducer polling rate.

* * * * *